United States Patent Office 2,952,879
Patented Sept. 20, 1960

2,952,879

PROCESS OF PREPARING SPONTANEOUSLY EXTENSIBLE STRUCTURES

Robert E. Kitson and Cecil E. Reese, Kinston, N.C., assignors to E. I. du Pont de Nemours and Company, Wilmington, Del., a corporation of Delaware No Drawing. Filed Feb. 28, 1958, Ser. No. 718,137

13 Claims. (Cl. 18—48)

This invention relates to novel spontaneously extensible structures of synthetic linear polyesters. More particularly, it relates to a novel process for producing linear terephthalate polyesters which have the property of undergoing a spontaneous and irreversible extension in length when they are heated. This application is a continuation-in-part of our copending application Serial No. 648,798, filed March 27, 1957, now abandoned.

It has been observed that filaments and films composed of polyethylene terephthalate and other linear terephthalate polyesters, when prepared by usual commercial methods, have a tendency to shrink when they are heated, i.e. to undergo spontaneous and irreversible retraction in length. Recently it has been found that certain structures composed of linear terephthalate polyesters may be treated at relatively low temperatures in such a way that the structures undergo spontaneous and irreversible extension in length when they are subsequently heated at a higher temperature. However, it has not been anticipated that linear terephthalate polyester structures could be treated with the aid of heat in such a way that the structures exhibit spontaneous and irreversible extensibility when they are subsequently heated again at the same temperature used in the first treatment, and even at much lower temperatures than the temperature of the first treatment. It has also not been realized that spontaneously and irreversibly extensible structures could be prepared by such a method rapidly and continuously in a manner suitable for commercial production of such structures.

It is an object of this invention to provide a rapid process for the preparation of linear terephthalate polyester structures which exhibit the property of spontaneous and irreversible extensibility when they are heated. Another object of the invention is to provide a rapid process by which structures exhibiting spontaneous and irreversible extensibility in water at 100° C. are produced. A further object of the invention is to provide a rapid process by which structures exhibiting spontaneous and irreversible extensibility in water at 90° C. and lower can be prepared.

These objects are realized by the process of the present invention, in which a linear terephthalate polyester structure having a crystallinity less than about 35%, said structure having a longitudinal axis and being oriented along said axis, is heated by passing it through a zone maintained at a temperature of at least about 90° C., said structure undergoing a shrinkage of between about 20% and about 70% while passing through said zone and being passed out of said zone and cooled before the crystallinity of said structure reaches the maximum crystallinity level achievable in said structure in said zone. Preferably, the structure is passed out of said zone and cooled while the crystallinity of the structure remains less than about 0.9 of the maximum crystallinity level achievable in said structure during prolonged exposure in said zone. Surprisingly, the product prepared in this way exhibits the property of spontaneous and irreversible extensibility along its longitudinal axis when it is again heated in a zone maintained under the same conditions as the first-mentioned zone. In most cases the structure exhibits the property of spontaneous and irreversible extensibility at temperatures even lower than the temperature at which it was first heated.

An important characteristic of the increase in length of the structure along its longitudinal axis is that the increase in length is irreversible; that is, the product does not return to its original length when it is cooled or dried. Another important characteristic of the phenomenon is that the increase in length is spontaneous and occurs without applying tension to the ends of the structure.

To facilitate an understanding of the invention, reference should be made to the following definitions and explanations of terms, it being understood that these terms, whenever employed herein in the description and claims, are to be construed in accordance with such definitions and explanations.

The intrinsic viscosity of the polymer is used herein as a measure of the degree of polymerization of the polymer and may be defined as:

$$\text{limit } \frac{\ln \eta_r}{C} \text{ as C approaches 0}$$

wherein $\eta_r$ is the viscosity of a dilute solution of the polymer in a solvent divided by the viscosity of the solvent per se measured in the same units at the same temperature; and C is the concentration in grams of the polymer per 100 ml. of solution. Fomal, which comprises 58.8 parts by weight of phenol and 41.2 parts by weight of trichlorophenol, is a convenient solvent for measuring the intrinsic viscosity of linear polyesters, and intrinsic viscosity values reported herein are with reference to Fomal as a solvent.

The expression "structures having a longitudinal axis" is used herein to denote shaped articles of polymers in which at least one dimension of the structure is relatively quite large and at least one dimension of the structure is relatively quite small. The expression therefore comprehends ribbons and films as well as filaments and fibers.

The birefringence, or double refraction, of a polymeric structure having a longitudinal axis is primarily dependent upon the orientation of the polymer molecules along the longitudinal axis and is a convenient measure of such orientation. The birefringence, which is also called the specific index of birefringence, may be measured by the retardation technique described in "Fibres From Synthetic Polymers" by R. Hill (Elsevier Publishing Company, New York, 1953), pages 266–8, using a polarizing microscope with rotatable stage together with a cap analyzer and quartz wedge. The birefringence is calculated by dividing the measured retardation by the measured thickness of the structure, expressed in the same units as the retardation.

A high degree of orientation may be induced in a linear terephthalate polyester structure by drawing it after it is spun or extruded, as disclosed by Whinfield and Dickson in their United States Patent 2,465,319. Instead of orienting the structure by drawing it in a separate step, orientation may be achieved simply by winding the extruded structure at a very high rate of speed. For example, when molten polyethylene terephthalate is spun and wound up as 1.4 denier filaments at 3000 yds./min. (yarn intrinsic viscosity 0.58), a birefringence of 0.04 is observed. Somewhat higher winding speeds are required to achieve the same birefringence level in filaments of higher denier.

In addition to the orientation which may be induced in linear terephthalate polyester structures, the polyesters may also be made to undergo crystallization. It is difficult to measure the crystallinity of linear terephthalate polyesters with great precision; however, there are several convenient methods for estimating the percentage crystallinity of linear terephthalate polyesters within a few percent, a sufficient approximation for the purpose of the present invention. One such method involves the application of X-ray diffraction techniques. The X-ray diffraction pattern of the linear terephthalate polyester sample is prepared by standard film techniques, using a vacuum camera, and an equitorial densitometer scan (perpendicular to the longitudinal axis of the structure) of the pattern is made. As is well known, the resulting curve exhibits three peaks, corresponding to the scattering from the 010, 110, and 100 diffraction planes, which represent the principal scattering from linear terephthalate polyester crystallites. To estimate the crystallinity of the sample, a straight line is drawn underneath the 010 peak and tangent to the curve on either side of the 010 peak, one of the tangent points being in the vicinity of the minimum between the 010 and 110 peaks and the second tangent point being on the other side of the 010 peak on the curve approaching the beam stop. A perpendicular is then dropped from the highest point of the 010 peak to the axis. The height of the point of intersection between this perpendicular line and the line tangent to the curve is then designated as $I_a$, representing the intensity of the amorphous background. The height of the highest point of the 010 peak itself is designated as $I_c$. Crystallinity is then estimated by the following formula:

$$\text{Percent crystallinity} = \frac{I_c - I_a}{I_c} \times 100\%$$

The amount of crystallinity which may be induced in a linear terephthalate polyester varies over a wide range depending upon the conditions to which the polyester is subjected. A sample of molten polyester which is cooled quite quickly to room temperature exhibits no crystallinity at all when it is tested in accordance with the technique described above; such a polyester is said to be amorphous. When a sample of the polyester is heated at 200° C. or above, the polyester may achieve crystallinity as high as 75%. At temperatures intermediate between room temperature and 200° C. the polyester will reach intermediate degrees of crystallinity.

The "maximum crystallinity level achievable" in a linear terephthalate polyester structure at a given temperature in a given medium is defined as the highest degree of crystallinity which may be induced among the polymer molecules within the structure at the given temperature in the given medium. Although a finite time is required for crystallization to take place in the polyester, the maximum crystallinity level achievable in the polyester is approached rather quickly, the required time being progressively shorter at progressively higher temperatures. Thus, the maximum crystallinity achievable in an oriented polyester is substantially reached within less than about a minute in water at 100° and within less than 5 seconds in air at 150° C. Longer exposures of the polyester in the same medium at the same temperature will induce only relatively slight further crystallization, if any.

The value of the maximum crystallinity level achievable will vary slightly for different samples of linear terephthalate polyester structures at any given temperature in any given medium, since the amount of crystallization which may occur within individual samples varies to some extent depending upon such factors as the orientation of the structure. However, for any particular linear terephthalate polyester structure the maximum crystallinity level achievable at a given temperature in a given medium is easily ascertained by exposing the structure to the given medium at the given temperature for varying time periods until a constant or maximum crystallinity level is reached. At temperatures above the melting point of the polyester the crystallinity will quickly rise to a maximum level and then fall off again within a time period usually less than one second.

By "linear terephthalate polyester" is meant a linear polyester in which at least about 85% of the recurring structural units are units of the formula

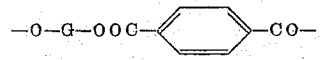

wherein —G— represents a divalent organic radical containing from 2 to 10 carbon atoms and attached to the adjacent oxygen atoms by saturated carbon atoms. Thus, the radical —G— may be of the form

where $m$ is 0 or 1 and A represents an alkalene radical, a cycloalkylene radical, a bis-alkylene ether radical, or other suitable organic radical. The linear terephthalate polyesters may be prepared by reacting terephthalic acid or an ester-forming derivative thereof with a glycol, G(OH)$_2$, where —G— is a radical as defined above, to form the bis-glycol ester of terephthalic acid, followed by polycondensation at elevated temperature and reduced pressure with elimination of excess glycol. Examples of suitable glycols include ethylene glycol, diethylene glycol, butylene glycol, decamethylene glycol, and bis-1,4-(hydroxymethyl)cyclohexane (hereinafter designated as p-hexahydroxylylene glycol). In a preferred embodiment of the invention, the radical —G— is the ethylene radical, —CH$_2$CH$_2$—; that is, the products are prepared from structures of polyethylene terephthalate or copolyesters thereof. In another preferred embodiment of the invention, the products are prepared from structures of poly (p-hexahydroxylylene terephthalate) or copolyesters thereof; i.e., the polyesters comprise at least about 85% recurring structural units of the formula

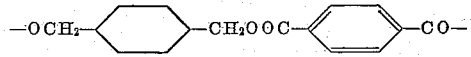

Mixtures of the glycols as defined may suitably be used to form copolyesters, or small amounts, e.g., up to about 15 mol percent, of a higher glycol may be used, such as a polyethylene glycol. Similarly, copolyesters may be formed by replacing up to about 15 mol percent of the terephthalic acid or derivative thereof with another dicarboxylic acid or ester-forming derivative thereof, such as adipic acid, dimethyl sebacate, isophthalic acid, or sodium 3,5-dicarbomethoxybenzenesulfonate. Linear terephthalate polyesters and copolyesters, especially polyethylene terephthalate polyesters and copolyesters, can readily be prepared in an oriented, relatively amorphous or non-crystalline form.

In preparing spontaneously extensible products in accordance with the present invention, the starting material polyester which should be used is a linear terephthalate polyester structure having a crystallinity less than about 35%, said structure having a longitudinal axis and being oriented along said axis. When the crystallinity of the structure is higher than about 35%, it is usually not possible to produce a structure which will exhibit the phenomenon of spontaneous and irreversible extensibility when heated. Preferably, a linear terephthalate polyester structure having an initial crystallinity less than about 10% is used, since such structures can be converted into products which exhibit a high degree of spontaneous extensibility at elevated temperatures and a considerable amount of spontaneous extensibility even at 90° C. or lower. In a highly preferred embodiment of the process, the linear terephthalate polyester structure is substantially amorphous. The amount of spontaneous extensibility which is achieved in the structure will also depend upon the initial orientation of the structure, as measured by the birefringence. A structure having a minimum birefringence of 0.04 is required in the process of the present invention to achieve a spontaneously extensible product. For example, a structure oriented to a birefringence of 0.04 in the extrusion step by winding it at about 3000 yds./min. or higher may be used. However, in the case of structures oriented by drawing them, a minimum birefringence of about 0.15 is usually required to prepare spontaneously extensible products in accordance with the process of the invention.

In order to carry out the process of the invention, the linear terephthalate polyester structure is heated by passing it through a zone maintained at a temperature of at least about 90° C., said structure undergoing a shrinkage of between about 20% and about 70% while passing through said zone and being passed out of said zone and cooled before the crystallinity of said structure reaches the maximum crystallinity level achievable in said structure in said zone. One critical factor in this process is the shrinkage of the structure as it passes through the zone wherein it is heated; unless the shrinkage is at least about 20%, the product will usually not be characterized by spontaneous and irreversible extensibility. Much higher shrinkages will frequently be observed. Preferably, for preparation of a product having a high degree of spontaneous extensibility, the structure is permitted to shrink at least about 35%, and still higher shrinkages are desirable. In some cases it is necessary to use elevated temperatures to obtain the desired high shrinkages in the structure.

Another critical factor in the process is the requirement that the structure be passed out of the heating zone and be cooled while the crystallinity remains substantially less than the maximum crystallinity level achievable in said structure during prolonged exposure in said zone. If the structure is not removed from the zone and cooled before its crystallinity reaches the maximum crystallinity level achievable in said structure in said zone, the product will not be characterized by spontaneous and irreversible extensibility when it is subsequently heated again under the conditions of the zone. Preferably the structure is removed from the zone and cooled while its crystallinity remains less than 0.9 of the maximum crystallinity level achievable in said structure in said zone.

The critical requirement that the crystallinity of the polyester remain less than the maximum crystallinity level achievable under the given conditions may also be expressed in terms of exposure temperature and maximum exposure time as parameters. Table I lists, for each temperature in a series of representative zone temperatures, the order of maximum exposure time to be observed in carrying out the process of the present invention. It is to be understood that the maximum exposure time limit varies to some extent among various linear terephthalate polyester structures, depending upon such factors as the initial crystallinity and orientation of the structures, and that the listed maximum exposure times represent regions of gradual rather than abrupt change from spontaneously extensible products to products which do not exhibit spontaneous extensibility. However, exposure times substantially greater than the order of maximum exposure time indicated in Table I, i.e., more than about twice the indicated time, usually do not result in useful products spontaneously extensible upon re-exposure to a zone maintained under the same conditions as the zone of original treatment, or at lower temperatures. The minimum exposure time limit is defined by the requirement that the structure undergo shrinkage of between about 20% and 70%; preferably 35% or more. When a high degree of spontaneous extensibility is desired, the structure should be subjected to heating only sufficiently long to achieve the required shrinkage.

TABLE I

| Zone temperature, °C.: | Order of maximum exposure time, seconds |
|---|---|
| 90 | 40 |
| 100 | 15 |
| 125 | 1.5 |
| 150 | 0.75 |
| 175 | 0.5 |
| 205 | 0.4 |
| 230 | 0.3 |
| 280 | 0.2 |
| 400 | 0.06 |

Below about 90° C. the required exposure time becomes relatively long, especially for some gaseous media, so that the process cannot be carried out rapidly. Although there is no upper temperature limit, the maximum exposure time becomes very short as the softening point of the polyester is exceeded. The process can be operated satisfactorily at temperatures as high as about 400° C. or even higher provided that high speed forwarding means are available.

In heating the linear terephthalate polyester structure within the critical time periods defined above, the structure is preferably passed through a zone wherein it is contacted with a fluid medium maintained at a temperature of at least about 90° C., the contact time being defined by the length of the zone and the speed at which the structure passes out of the zone. In one embodiment of the invention, the fluid medium is a liquid, such as water. In another embodiment of the invention the fluid medium is a gas, such as steam, air, or nitrogen. It will be observed that the maximum exposure time at a given temperature is somewhat shorter in water, and to some extent also shorter in steam, than in air. The structure may be passed through a chamber or bath containing the hot fluid medium. Alternatively, the structure may be passed through a nozzle concurrently with a jet stream of the hot fluid medium; where such concurrent jet streams are used, the order of maximum exposure time is reduced by a factor of about 4 from the corresponding time indicated in Table I. The structure may also be passed through a zone in which it is heated in an equivalent way by other means, such as by infrared means or other means in place of the heated fluid medium. The term "zone," as used herein, is therefore intended to comprehend any fixed region containing heating means through which the linear terephthalate structure may be passed to bring about rapid heating of the structure followed by rapid cooling as the structure passes out of said zone.

The process of the invention is readily combined with other continuous process steps in preparing a desired linear terephthalate polyester structure. In a preferred embodiment of the invention, a substantially amorphous and substantially unoriented linear terephthalate polyester structure is drawn to produce an oriented, still substantially amorphous linear terephthalate structure, following which the structure is passed without intermediate packaging through a zone in which it is heated at a temperature of at least about 90° C. within the critical time period defined above, while undergoing a reduction in speed of between about 20% and about 70%, preferably 35% or more, while passing through the zone. In this way, the substantially amorphous and substantially unoriented linear terephthalate polyester structure obtained by the usual extrusion or spinning procedure is converted in one step into a spontaneously extensible product suitable for commercial use.

Linear terephthalate polyester structures prepared by the process of the invention exhibit spontaneous and irreversible extensibility when they are subjected for a second time to the same conditions used in the heating zone in their preparation. In this second heat treatment the exposure time is usually longer than the exposure time in the first treatment, since below the softening point of the polymer there is no upper time limit for this second heat treatment. Usually the products exhibit spontaneous and irreversible extensibility at even lower temperatures than the temperature of the original treatment, and such lower temperatures will frequently be used to bring about the spontaneous extensibility step in commercial practice, especially when the original heat treatment is carried out at a temperature above the softening point of the polymer. When a given product is heated at an elevated temperature, the observed amount of spontaneous and irreversible extensibility is higher than the amount observed by treating the same product at a lower temperature. Those products which exhibit the highest degree of spontaneous and irreversible extensibility also begin to exhibit the phenomenon to an appreciable extent at the lowest temperatures; for this reason, processes which yield products spontaneously extensible at 90° C. or even lower are the preferred embodiments of this invention.

If spontaneous extensibility is brought about in an extensible linear terephthalate polyester by exposure to a given set of conditions, the product will not again exhibit spontaneous extensibility under the same conditions, unless the exposure is so brief that the full amount of spontaneous extensibility is not achieved in the first instance. Surprisingly, however, when an extensible product is allowed to undergo spontaneous and irreversible extension in length at one temperature, a second occurrence of the phenomenon of spontaneous and irreversible extensibility may then be achieved with the same product by heating the product at a higher temperature, up to about 200° C. The ability of the product to undergo this secondary spontaneous increase in length is important, since it is frequently desired to subject the product to treatments at intermediate temperatures before taking full advantage of the property of spontaneous extensibility. For example, in the manufacture of spontaneously extensible sewing threads, it may be desired to dye the threads at conventional temperatures in the range of 100° C. before the threads are used in sewing.

The following examples will serve to illustrate the invention, although they are not intended to be limitative.

Polyethylene terephthalate is prepared in accordance with the general procedure described in United States Patent 2,465,319 to Whinfield and Dickson, in which dimethylterephthalate (1 mol) and ethylene glycol (about 2.1 mols) are heated together in the presence of a catalyst until the evolution of methanol ceases, following which the mixture is heated at an elevated temperature and reduced pressure with evolution of glycol until polyethylene terephthalate having the desired intrinsic viscosity is attained. Copolyesters of polyethylene terephthalate are prepared by substituting for a portion of the dimethyl terephthalate an equivalent portion of another dicarboxylic ester; thus polyethylene terephthalate/isophthalate (90/10) is prepared from a mixture of 0.90 mol of dimethyl terephthalate, 0.10 mol of dimethyl isophthalate, and about 2.1 mols of the ethylene glycol. In each of the examples the spontaneous extensibility of the product upon exposure to the same conditions used in the heating zone in its preparation, or upon exposure to milder conditions, is given. In some cases the spontaneous extensibility of the product upon exposure to conditions more severe than the conditions used in the heating zone in its preparation is also given.

Example 1

Polyethylene terephthalate having an intrinsic viscosity of 0.57 is spun at 295° C. through a spinneret having 34 orifices, each 0.009 inch in diameter, and the yarn is wound up at a speed of 3775 yds./min. The resulting yarn is tenacious as spun, as described by Hebeler in his United States Patent 2,604,689. The yarn is found to have a denier as spun of 120, a birefringence of 0.0440, and a crystallinity level of 0% (substantially amorphous) as measured by the X-ray diffraction technique described above. A 26.0 cm. length of the yarn is dipped in water at 100° C. for an exposure time approximating 1 second, after which the length of the yarn is found to be only 10.4 cm., corresponding to 60% shrinkage. The birefringence of the heat-treated yarn is found to be 0.0114 and its crystallinity is found to be 15%. A 10.4 cm. length of the heat-treated yarn is then subjected to a second heat treatment by immersing it, free of tension, in a bath of water maintained at 100° C. for 5 minutes, after which its new length is found to be 11.4 cm., corresponding to a 9.6% spontaneous and irreversible extension in the length of the yarn during the second heat treatment, based on its measured length prior to the second heat treatment. Other samples of the heat-treated yarn exhibit spontaneous and irreversible extensibility amounting to 8.6% and 15.2% in 90° C. water and 200° C. air, respectively (5 minute exposures).

Another sample of the spun yarn is immersed in a bath of water maintained at 100° C. for 5 minutes instead of 1 second. The yarn shrinks 60% during this first heat treatment and the crystallinity of the yarn is subsequently found to be 43%. However, the resulting heat-treated yarn does not exhibit any change in length when it is again immersed in water at 100° C. for 5 minutes.

Example 2

Polyethylene terephthalate having an intrinsic viscosity of 0.57 is spun at 295° C. through a spinneret having 27 orifices, each 0.009 inch in diameter, and the yarn is wound up at a speed of 1200 yds./min. The yarn is found to have a denier as spun of 135, a birefringence of 0.0094, and a crystallinity level of 0% (substantially amorphous). The yarn is passed from a supply package through a bath of water at 25° C. and over a sponge to leave a thin uniform film of water on the yarn, after which it is passed around a feed roll, around a draw pin 1.6 inches in diameter maintained at a temperature of 100° C., and then around a draw roll, finally being wound up on a suitable package. The speed at the draw roll is 545 yds./min. and the draw ratio is 2.937. The drawn yarn is found to have a birefringence of 0.2025, and its crystallinity is found to be still 0%. A sample of the drawn yarn is dipped in water at 100° C. for an exposure time approximating 0.1 second, whereupon it shrinks 51%. The birefringence of the heat-treated yarn is found to be 0.0319 and its crystallinity is found to be 25%. When the yarn is subsequently immersed for 5 minutes in water at 100° C., it exhibits a spontaneous and irreversible extensibility of 17.0%, based on its measured length prior to this second heat treatment. Other samples of the heat-treated yarn exhibit spontaneous and irreversibility amounting to 15.0% and 29.2% in 90° C. water and 200° C. air, respectively (5 minute exposures).

Another sample of the drawn yarn is immersed in a bath of water maintained at 100° C. for 5 minutes instead of 0.1 second. The yarn shrinks 43% during this first heat treatment, and the crystallinity of the yarn is subsequently found to be 44%. However, the resulting heat-treated yarn does not exhibit any change in length when it is again immersed in water at 100° C. for 5 minutes.

Example 3

Polyethylene terephthalate yarn is spun and drawn as described in Example 2, except that various draw ratios are used. In Table II the draw ratios and the birefringence of the drawn yarns are listed; the crystallinity of the drawn yarns is 0% except in entries 3 and 3C, in which cases the crystallinity is 3%. The drawn yarns are then passed from a feed roll through an oven to a suitable wind-up package. In the experiment listed in the first entry in the table, an air oven 18 inches in length and maintained at 133° C. is used, the yarn entrance and exit being 1/16 inch in diameter. In the experiments listed in entries 2, 3, 4, and 5 in the table, a steam oven 12 inches in length is used, the yarn entrance and exit being ½ inch in diameter and steam at 100° C. being introduced along the bottom of the oven at a rate sufficient to keep the oven filled with steam. The yarn speed at the exit of the oven is 150 y.p.m. in entries 1, 2, 3, 4, and 5; in entries 1C, 2C, 3C, 4C, and 5C the yarn is held in the oven for 300 seconds. The shrinkage of the yarn as it passes through the oven, and the exposure time, observed or calculated from the oven length and yarn exit speed, are given in the table. Also shown are the birefringence and crystallinity of the heat-treated yarns, as well as the spontaneous and irreversible extensibility exhibited by the yarns when they are again subjected to the oven conditions.

nozzle at 608 yds./min. and wound up at 450 yds./min., corresponding to a shrinkage of 26% and an exposure time of 0.005 second, based on the rate of withdrawal of the yarn from the nozzle. The heat-treated yarn has a birefringence of 0.1533 and a crystallinity level of 47%. Samples of the yarn exhibit a spontaneous and irreversible extensibility of 1.7% and 2.5% in water at 90° C. and 100° C., respectively (5 minute exposures).

In still another experiment, a quantity of the spun yarn of Example 2 is passed from a suitable package through a bath of 25° C. water and over a sponge to leave a thin uniform film of water on the yarn, after which it is passed around a feed roll, around a draw pin 1.6 inches in diameter maintained at a temperature of 100° C., around a draw roll, and thence directly through the hollow needle

TABLE II

| | Draw Ratio | Drawn Yarn Biref | Shrinkage | Exposure, Time, Sec. | Properties After First Heat Treatment | | |
|---|---|---|---|---|---|---|---|
| | | | | | Biref | Percent Cryst. | Spontaneous Extensibility |
| 1 | 2.937 | 0.2025 | 50% | 0.20 | | 20 | 14% (air, 133° C., 5 min.). |
| 1C | 2.937 | 0.2025 | 43 | 300. | | 40 | 0 (air, 133° C., 5 min.). |
| 2 | 2.937 | 0.2025 | 60.5 | 0.13 | 0.0280 | 23 | 17 (steam, 100° C., 5 min.). |
| 2C | 2.937 | 0.2025 | 53 | 300. | | 45 | 0 (steam, 100° C., 5 min.). |
| 3 | 3.113 | 0.2060 | 41 | 0.13 | 0.1385 | 27 | 9 (steam, 100° C., 5 min.). |
| 3C | 3.113 | 0.2060 | 35 | 300. | | 47 | 0 (steam, 100° C., 5 min.). |
| 4 | 2.937 | 0.2025 | 57 | 0.13 | 0.0627 | 25 | 16 (steam, 100° C., 5 min.). |
| 4C | 2.937 | 0.2025 | 50 | 300. | | 45 | 0 (steam, 100° C., 5 min.). |
| 5 | 2.937 | 0.2025 | 40 | 0.13 | 0.0896 | 28 | 5 (steam, 100° C., 5 min.). |
| 5C | 2.937 | 0.2025 | 36 | 300. | | 46 | 0 (steam, 100° C., 5 min.). |

Those entries in the table identified by the letter C after the number illustrate the results of control experiments in which the yarns are subjected to the oven conditions for much longer periods of time, as indicated. The crystallinity of these heat-treated control yarns are also listed. As shown in the table, these yarns do not exhibit any change in length when they are again exposed to the same oven conditions.

Example 4

A quantity of polyethylene terephthalate yarn spun and drawn as in Example 2, except that the applied draw ratio is 3.395, is found to have a birefringence of 0.2259 and a crystallinity of 8%. The drawn yarn is passed from a feed roll through a hollow needle leading into a nozzle having a throat diameter of 0.062 inch and a 7° flared exit passage and thence to a suitable wind-up package. Air is maintained at 250° C. and 5 p.s.i. pressure on the entrance side of the nozzle, so that a jet of hot air is caused to flow through the nozzle in the same direction as the yarn is passed through the nozzle. The tip of the hollow needle from which the yarn is delivered is located within the throat of the nozzle and the effective distance through which the yarn is heated is 1.35 inch. The yarn is passed into the nozzle at 804 yds./min. and wound up at 450 yds./min., corresponding to a shrinkage of 44% and an exposure time of 0.005 second, based on the rate of withdrawal of the yarn from the nozzle. The heat-treated yarn has a birefringence of 0.1425 and a crystallinity of 38%. Samples of the yarn exhibit a spontaneous and irreversible extensibility of 2.3% and 4.0% in water at 90° C. and 100° C., respectively (5 minute exposure).

In another experiment, a quantity of the spun yarn of Example 2 is passed from a feed roll around a 1.6-inch pin maintained at 98° C. to draw roll and subsequently wound up in a suitable package. The applied draw ratio is 3.353, and the yarn speed at the draw roll is 604 yds./min. The yarn is not contacted with water during this drawing operation. The drawn yarn has a birefringence of 0.2270 and a crystallinity level of 33%. The drawn yarn is passed through the hollow needle and the nozzle described above to a suitable wind-up package. The air is maintained at 265° C. and 5 p.s.i. on the entrance side of the nozzle. The yarn is passed into the and nozzle described above, finally being wound up on a suitable package. The applied draw ratio is 2.817, the yarn speed at the draw roll is 300 yds./min., and the speed at which the yarn passes out of the nozzle is 150 yds./min. Air is maintained at 175° C. and 30 p.s.i. on the entrance side of the nozzle. The calculated shrinkage of the yarn in the nozzle is 50% and the calculated time of exposure to the 175° C. air is 0.016 second. The crystallinity of the yarn prepared in this way is 27% and its birefringence is 0.0476. Samples of the yarn exhibit a spontaneous and irreversible extensibility of 13.5% and 15.3% in water at 90° C. and 100° C., respectively (5 minute exposure).

Example 5

A quantity of polyethylene terephthalate yarn spun and drawn as in Example 2 is passed from a feed roll through a hollow needle leading into a nozzle having a throat diameter of 0.062 inch and a 7° flared exit passage and thence to a suitable wind-up package. Water maintained at 97° C. is passed through the nozzle at a rate of 1000 ml./min. in the same direction as the yarn is passed through the nozzle. The tip of the hollow needle from which the yarn is delivered is located within the throat of the nozzle and the yarn remains in contact with the water for a distance of 6 inches. The yarn is passed into the nozzle at 366 yds./min. and wound up at 150 yds./min., corresponding to a shrinkage of 59% and an exposure time of 0.067 second, based on the rate of withdrawal of the yarn from the nozzle. The heat-treated yarn is found to have a crystallinity of 20% and a spontaneous and irreversible extensibility of 17% in 97° C. water (5 minute exposure). However, when the drawn yarn is allowed to remain in contact with the 97° C. water for 300 seconds instead of 0.067 second, resulting in 52% shrinkage of the yarn, the crystallinity of the heat-treated yarn is 45% and the yarn does not exhibit any change in length when it is again heated in 97° C. water (5 minute exposure).

Example 6

A strip of unoriented, substantially amorphous polyethylene terephthalate film 0.5 inch wide and 1 mil thick is drawn by hand in the longitudinal direction at a draw ratio of 3.0 while the film is immersed in water at 25° C. A length of the drawn film is dipped in water at 100° C. for a contact time approximating 0.1 second, resulting in a shrinkage of 32.5% in the longitudinal direction of the film. Subsequently, the film exhibits a spontaneous and irreversible extensibility in the longitudinal direction of 5.6% in water at 100° C. However, when a length of of the drawn film is allowed to remain in contact with water at 100° C. for 5 minutes instead of 0.1 second, it does not exhibit any change in length when subsequently exposed to 100° C. water (5-minute exposure).

*Example 7*

A polyethylene terephthalate/isophthalate (90/10) copolyester having an intrinsic viscosity of 0.64 is spun at 295° C. through a spinneret having 34 orifices, each 0.009 inch in diameter, and the yarn is wound up at a speed of 1206 yds./min. The yarn has a denier of 135 as spun and is substantially amorphous and relatively unoriented. The spun yarn is passed from a supply package through a bath of water at 25° C. and over a sponge to leave a thin uniform film of water on the yarn, after which it is passed around a feed roll, around a draw pin 1.6 inches in diameter maintained at a temperature of 100° C. and then around a draw roll, finally being wound up on a suitable package. The speed at the draw roll is 545 yds./min. and the draw ratio is 3.113. The drawn yarn is oriented but still substantially amorphous. The drawn yarn is then immersed in 100° C. water for an exposure time approximating 0.1 second, resulting in a shrinkage of 42.6%. Subsequently, the yarn exhibits a spontaneous and irreversible extensibility of 10.3% in water at 100° C. (5 minute exposure). However, when a sample of the drawn yarn is immersed in 100° C. water for 5 minutes instead of 0.1 second, the resulting heat-treated yarn does not exhibit any change in length when it is again immersed in water at 100° C. for 5 minutes.

A polyethylene terephthalate/isophthalate (94/6) copolyester having an intrinsic viscosity of 0.60 is spun at 295° C. through a spinneret having 17 orifices, each 0.009 inch in diameter, and the yarn is wound up at a speed of 1206 yds./min. The spun yarn is drawn as described above, except that the draw ratio is 3.165 instead of 3.113. The drawn yarn is oriented but still substantially amorphous. The drawn yarn is then immersed in 100° C. water for an exposure time approximating 0.1 second, resulting in a shrinkage of 56%. Subsequently, the yarn exhibits a spontaneous and irreversible extensibility of 20% in water at 100° C. (5 minutes exposure). However, when a sample of the drawn yarn is immersed in 100° C. water for 5 minutes instead of 0.1 second, the resulting heat-treated yarn does not exhibit any change in length when it is again immersed in water at 100° C. for 5 minutes.

A polyethylene terephthalate/5-(sodium sulfo)- isophthalate (98/2) copolyester having an intrinsic viscosity of 0.50 is prepared by a condensation reaction between 2.1 moles of ethylene glycol and a mixture of 0.98 mol of dimethyl terephthalate and 0.02 mol of sodium 3,5-dicarbomethoxybenzenesulfonate. The copolyester is spun at 295° C. through a spinneret having 34 orifices, each 0.009 inch in diameter, and the yarn is wound up at a speed of 1206 yds./min. The yarn has a denier of 150 as spun and is substantially amorphous and unoriented. The spun yarn is then drawn as described above, the draw ratio being 2.937. The drawn yarn is oriented but still substantially amorphous. The drawn yarn is then immersed in 100° C. water for an exposure time approximating 0.1 second, resulting in a shrinkage of 55%. Subsequently, the yarn exhibits a spontaneous and irreversible extensibility of 16.7% in water at 100° C. (5 minute exposure). However, when a sample of the drawn yarn is immersed in 100° C. water for 5 minutes instead of 0.1 second, the resulting heat-treated yarn does not exhibit any change in length when it is again immersed in water at 100° C. for 5 minutes.

*Example 8*

To 97 parts (0.5 mole) of dimethyl terephthalate and 151 parts of p-hexahydroxylylene glycol (1.05 moles) is added 0.02 part of tetraisopropyl titanate, and the mixture is heated with evolution of methanol until no more methanol is obtained. The mixture is then placed in a tube and heated at 280° C. at a pressure of 0.4 mm. of mercury for 3 hours, with evolution of the glycol. The resulting poly(p-hexahydroxylylene terephthalate) is found to have an intrinsic viscosity of 0.65. It is spun at 291° C. through a spinneret having five orifices, each 0.007 inch in diameter, and the yarn is wound up at a speed of 56 yds./min. The yarn has a denier of 130 as spun and is substantially amorphous and relatively unoriented. The spun yarn is then drawn by hand at a draw ratio of 2.4 over a hot plate maintained at 90 C. The resulting yarn is oriented but still substantially amorphous. The drawn yarn is then dipped in water at 100° C. for 5 seconds, resulting in a shinkage of 48.5%. Samples of the heat-treated yarn subsequently exhibit spontaneous and irreversible extension in length amounting to 7.1%, 11.0%, and 17.8% when they are exposed to 90° C. water for 7 minutes, 100° C. water for 5 minutes, and 190° C. air for 15 minutes, respectively. Another sample of the spun yarn is drawn by hand at a draw ratio of 2.3 over a hot plate maintained at 90° C., following which the yarn is dipped in water at 100° C. for 5 seconds, resulting in a shrinkage of 47.2%. Samples of the heat-treated yarn subsequently exhibit spontaneous and irreversible extension in length amounting to 1.6%, 7.5%, and 12.4% when they are exposed to 90° C. water for 7 minutes, 100° C. water for 5 minutes, and 190° C. air for 15 minutes, respectively.

In another experiment, 151 parts of p-hexahydroxylylene glycol are reacted with 95 parts of dimethyl terephthalate and 2.97 parts of sodium 3,5-dicarbomethoxybenzenesulfonate, in the presence of 0.02 part of tetraisopropyl titanate, following the general procedure outlined above, to prepare a copolyester having an intrinsic viscosity of 0.51. The copolyester is spun into 5-filament, 220-denier yarn in the manner described above. The spun yarn is drawn by hand at a draw ratio of 2.0 over a hot plate maintained at 88° C., following which the yarn is dipped in water at 100° C. for 5 seconds, resulting in a shrinkage of 40.3%. Samples of the heat-treated yarn subsequently exhibit spontaneous and irreversible extension in length amounting to 2.3%, 4.7%, and 6.4% when they are exposed to 90° C. water (7 minutes), 100° C. water (5 minutes), and 170° C. air (15 minutes), respectively. Another sample of the spun yarn, when drawn at a draw ratio of 1.97 by hand over a hot plate maintained at 93° C., shrinks 43.2% when dipped in 100° C. water for 5 seconds. Samples of the heat-treated yarn subsequently exhibit spontaneous and irreversible extension in length amounting to 5.0%, 9.4%, and 10.8% when exposed to 90° C. water (7 minutes), 100° C. water (5 minutes), and 190° C. air (15 minutes), respectively.

Filaments possessing the property of spontaneous and irreversible extensibility are tenacious and exhibit other desirable properties usually associated with filaments of linear terephthalate polyesters. The novel filaments are useful for a variety of purposes. For example, filaments exhibiting spontaneous extensibility are excellent for use in sewing thread in which seam puckering is eliminated by spontaneous extension of the sewing thread in the seam after the garment has been sewn. Novel yarns which bulk permanently when heated may be prepared by plying spontaneously extensible filaments with filaments which have a degree of residual shrinkage, or alternatively, with filaments which have a different degree of spontaneous extensibility. Such bulkable yarns are highly desired for preparation of cottonlike fabrics.

It will be apparent that many widely different embodiments of this invention may be made without departing from the spirit and scope thereof, and therefore it is not intended to be limited except as indicated in the appended claims.

We claim:

1. The process of preparing structures capable of spontaneously and irreversibly extending in length on heating at above about 90° C. which comprises passing a linear terephthalate polyester structure having a crystallinity of less than about 35%, said structure having a longitudinal axis and being oriented along the said axis, through a zone maintained at a temperature of at least 90° C. for a time sufficient to shrink the structure along its axis between about 20% and 70% and thereafter cooling the said structure before its crystallinity reaches the maximum level achievable in the said zone.

2. The process of claim 1 in which the structure is cooled while its crystallinity is less than about 0.9 of the said maximum achievable level.

3. The process of claim 1 in which the structure is a fiber.

4. The process of claim 1 in which the structure is a film.

5. The process of claim 1 in which the initial crystallinity of the terephthalate polyester is less than about 10%.

6. The process of claim 1 in which the initial linear terephthalate polyester is substantially amorphous.

7. The process of claim 1 in which the initial birefringence of the terephthalate polyester is at least 0.04.

8. The process of claim 1 in which the initial birefringence of the terephthalate ester is at least 0.15.

9. The process of claim 1 in which the shrinkage is at least 35%.

10. The process of claim 1 in which the structure is passed through the said zone within a period of time not greater than that indicated in Table I for the temperature of the said zone.

11. The process of claim 1 in which said polyester comprises at least about 85% recurring structural units of the formula:

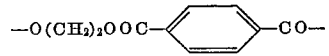

12. The process of claim 1 in which said polyester comprises at least about 85% recurring structural units of the formula:

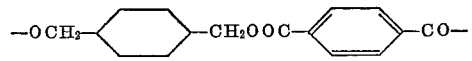

13. The process of claim 1 in which the said structure is oriented by drawing and is immediately thereafter passed through said zone in a continuous manner.

References Cited in the file of this patent

UNITED STATES PATENTS

| | | |
|---|---|---|
| 2,353,023 | Freund | July 4, 1944 |
| 2,373,215 | Young | Apr. 10, 1945 |
| 2,377,928 | Fielitz et al. | June 12, 1945 |
| 2,604,689 | Hebeler | July 29, 1952 |
| 2,734,794 | Calton | Feb. 14, 1956 |

UNITED STATES PATENT OFFICE

CERTIFICATE OF CORRECTION

Patent No. 2,952,879            September 20, 1960

Robert E. Kitson et al.

It is hereby certified that error appears in the printed specification of the above numbered patent requiring correction and that the said Letters Patent should read as corrected below.

Column 2, line 59, strike out --- it is spun or extruded, as disclosed ---; column 8, line 53, for "irreversibility" read -- irreversible extensibility ---; column 11, line 8, strike out "of"; column 12, line 19, for "90C." read -- 90°C. ---.

Signed and sealed this 25th day of April 1961.

(SEAL)
Attest:

ERNEST W. SWIDER            DAVID L. LADD
Attesting Officer            Commissioner of Patents